(12) United States Patent
Frimpong

(10) Patent No.: US 9,837,568 B1
(45) Date of Patent: Dec. 5, 2017

(54) PORTABLE SOLAR-POWERED BACK-UP ELECTRICITY GENERATION SYSTEM AND ASSOCIATED USE THEREOF

(71) Applicant: Akwesi Frimpong, Bronx, NY (US)

(72) Inventor: Akwesi Frimpong, Bronx, NY (US)

( * ) Notice: Subject to any disclaimer, the term of this patent is extended or adjusted under 35 U.S.C. 154(b) by 1191 days.

(21) Appl. No.: 13/850,186

(22) Filed: Mar. 25, 2013

(51) Int. Cl.
   *H02N 6/00* (2006.01)
   *H01L 31/042* (2014.01)

(52) U.S. Cl.
   CPC ................................. *H01L 31/0422* (2013.01)

(58) Field of Classification Search
   CPC ............................. H02S 10/40; H01L 31/0422
   See application file for complete search history.

(56) References Cited

U.S. PATENT DOCUMENTS

| 5,811,958 | A | 9/1998 | Yamamoto | |
|---|---|---|---|---|
| 6,642,691 | B2 | 11/2003 | Alsina | |
| 2009/0139562 | A1* | 6/2009 | Thomas | H02S 20/20 136/245 |
| 2009/0230783 | A1 | 9/2009 | Weed et al. | |

* cited by examiner

*Primary Examiner* — Uyen Tran
(74) *Attorney, Agent, or Firm* — Ashkan Najafi

(57) ABSTRACT

A combined window frame and solar-powered electricity generating device for supplying power to an existing in-house appliance includes a combined window frame and solar-powered electricity generating device including a window frame, and a solar-powered electricity generating device removably coupled to the window frame in such a manner that the solar-powered electricity generating device is accessible from an interior side of the window frame. Advantageously, upon receiving a user input, the solar-powered electricity generating device cooperates with the window frame thereby generating and transmitting power to an existing in-house appliance.

7 Claims, 14 Drawing Sheets

PORTABLE SOLAR-POWERED BACK-UP ELECTRICITY GENERATION SYSTEM AND ASSOCIATED USE THEREOF

CROSS REFERENCE TO RELATED APPLICATIONS

This application claims the benefit of U.S. Provisional Application No. 61/614,780 filed Mar. 23, 2012, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

Exemplary embodiment(s) of the present disclosure relate to solar-powered electricity generation systems and, more particularly, to a portable, solar-powered, back-up electricity generation system for storing and providing power to in-home appliances.

Prior Art

Homeowners and households today rely heavily upon electrical power, virtually all of it supplied by electric utilities. As long as the "grid" doesn't go down or become interrupted, everything is fine: you depend on the utility for your power, you pay for the power you use, and if you look no further than this, life is great. If you look just a little further, though, there are good reasons to equip yourself with a back-up generator, and good reasons to look into "alternative" sources of electrical energy.

For one thing, even in the climate-controlled comfort of our homes and offices, the situation can change in an instant. A winter storm takes down the power lines, the cable, the phone, the furnace; a tropical storm leaves us without the comfort of air-conditioning, bereft of our computer and television, microwave and stove—and once the power is down, the food in the refrigerator becomes a major concern. Some households have equipped themselves with gasoline-powered generators for such contingencies, but these generators are both loud and expensive, and because they release dangerous exhaust gases they must be used carefully and outside the structure—something that may or may not be possible for a given household. In this case, while a back-up generator is desirable, some sort of "alternative" energy source—wind or solar, perhaps—may relieve us of the need for gasoline, and the hazards of its combustion.

From another point of view, we might consider that the utility supplying our power is generating that power by burning coal or oil, thus generating not only electricity but also so-called "greenhouse gases." Now, whether or not one accepts "anthropogenic" or man-caused global warming as a result of these gases, there is no denying that our reliance on imported Middle East oil is dangerous to both our economy and our national security. Getting off of Middle East oil, again, requires us to find "green energy" solutions: to generate electricity through solar and wind power; to produce more fuel-efficient and alternative-fuel cars, and so forth.

Clearly, then, there are a variety of good reasons for homeowners and householders to look for economical, reliable, environmentally friendly sources of primary or back-up electrical power: and such a source is the invention to be described and discussed in this report.

Accordingly, a need remains for a portable solar-powered back-up electricity generating system in order to overcome prior art shortcomings. The exemplary embodiment(s) satisfy such a need by providing a portable solar-powered back-up electricity system that is convenient and easy to use, lightweight yet durable in design, versatile in its applications, and designed for providing a power sources to operate in-home appliances.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a combined window frame and solar-powered electricity generating device for supplying power to an existing in-house appliance. These and other objects, features, and advantages of the non-limiting exemplary embodiment(s) are provided by a combined window frame and solar-powered electricity generating device including a window frame, and a solar-powered electricity generating device removably coupled to the window frame in such a manner that the solar-powered electricity generating device is accessible from an interior side of the window frame. Advantageously, upon receiving a user input, the solar-powered electricity generating device cooperates with the window frame thereby generating and transmitting power to an existing in-house appliance.

In a non-limiting exemplary embodiment, the solar-powered electricity generating device includes a cart disposed adjacent to the interior side of the window frame, a solar panel assembly located exterior of the cart and removably coupled to the window frame, a controller located within the cart, a voltage converter located exterior of the cart and communicatively coupled to the solar panel assembly as well as the controller, a battery recharging device located within the cart and communicatively coupled to the controller, a rechargeable battery located within the cart and communicatively coupled to the battery recharging device, and a plurality of plug-in electrical sockets communicatively coupled to the rechargeable battery. Advantageously, the voltage converter receives and modifies an initial power input signal from the solar panel assembly and thereafter generates and transmits a transformed power output signal to the battery recharging device for recharging the rechargeable battery.

In a non-limiting exemplary embodiment, the window frame includes a perimeter support surface, and a transparent glass panel attached to the perimeter support surface. In this manner, the solar panel assembly is removably affixed directly to each of the perimeter support surface as well as the transparent glass panel.

In a non-limiting exemplary embodiment, the solar panel assembly includes a central stationary solar panel having a plurality of hinges attached to opposed corners thereof, respectively. A plurality of peripheral swing-out solar panels are pivotally and adjustably coupled to the hinges, respectively. Advantageously, the peripheral swing-out solar panels are configured to articulate about respective fulcrum axes adjacent to the central stationary solar panel as well as tilt along a plane relative to a stationary plane of the central stationary solar panel.

In a non-limiting exemplary embodiment, the peripheral swing-out solar panels are detachable from the central stationary panel and removably stored within the cart.

In a non-limiting exemplary embodiment, the solar panel assembly is directly coupled to the interior face of the window frame and fitted within the perimeter support surface thereof.

In a non-limiting exemplary embodiment, the solar panel assembly is directly coupled to an exterior face of the window frame.

In a non-limiting exemplary embodiment, wherein one of the central stationary solar panel and the peripheral swing-out solar panels is fitted within the perimeter support surface of the window frame. In addition, another one of the central stationary solar panel and the peripheral swing-out solar panels extends beyond the perimeter support surface of the window frame.

A method of utilizing a combined window frame and solar-powered electricity generating device for supplying power to an existing in-house appliance. Such a method includes the chronological steps of: providing a window frame; providing and removably coupling a solar-powered electricity generating device to the window frame; accessing the solar-powered electricity generating device from an interior side of the window frame; and upon receiving a user input, the solar-powered electricity generating device cooperating with the window frame thereby generating and transmitting power to the existing in-house appliance.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
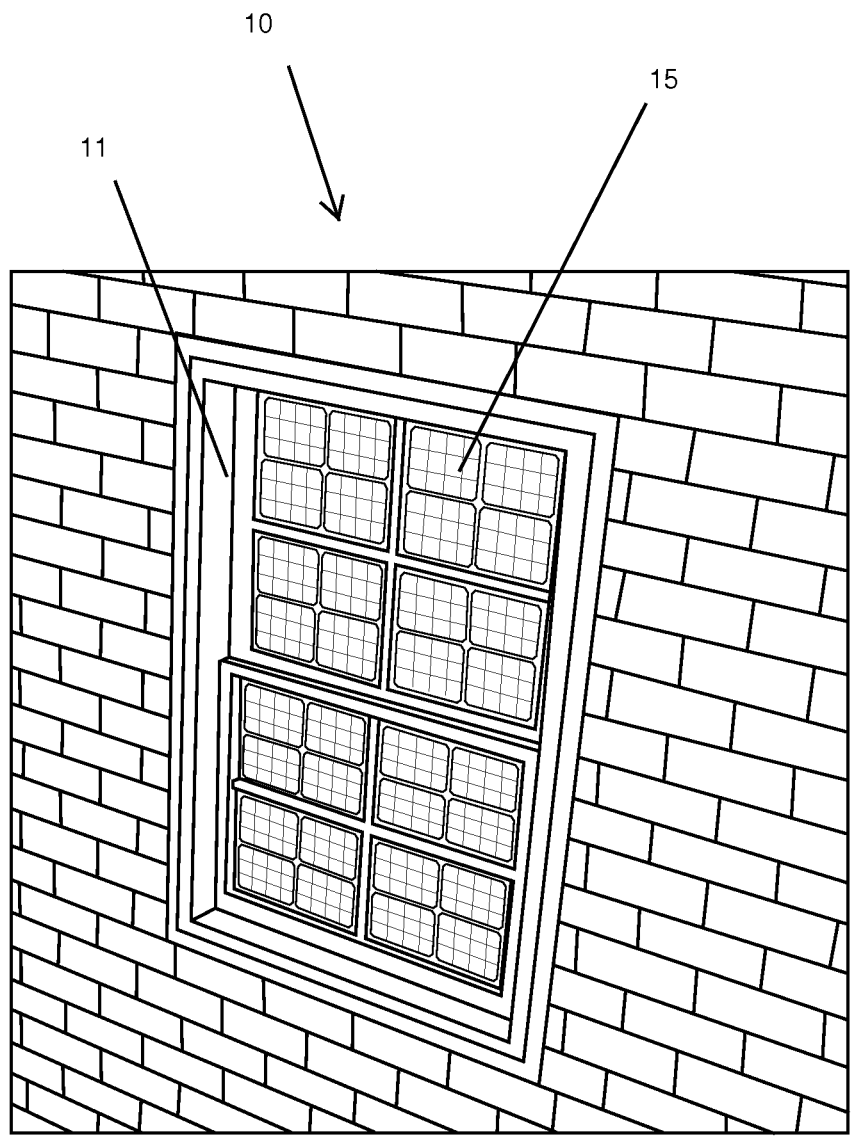
FIG. 1 is a perspective view of a combined window frame and solar-powered electricity generating device, in accordance with a non-limiting exemplary embodiment.
Figure 2:
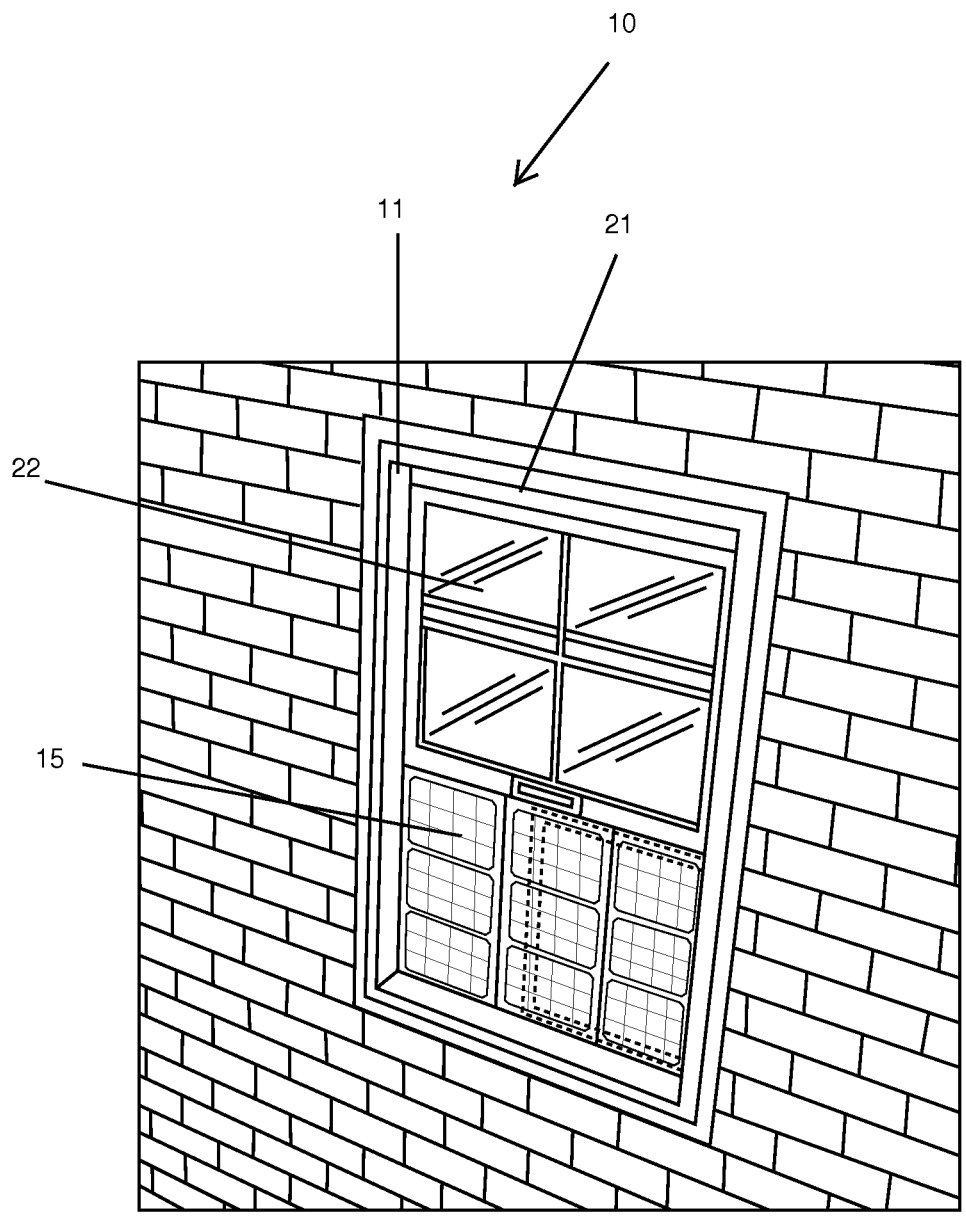
FIG. 2 is a perspective view of a combined window frame and solar-powered electricity generating device, in accordance with another non-limiting exemplary embodiment.
Figure 3:
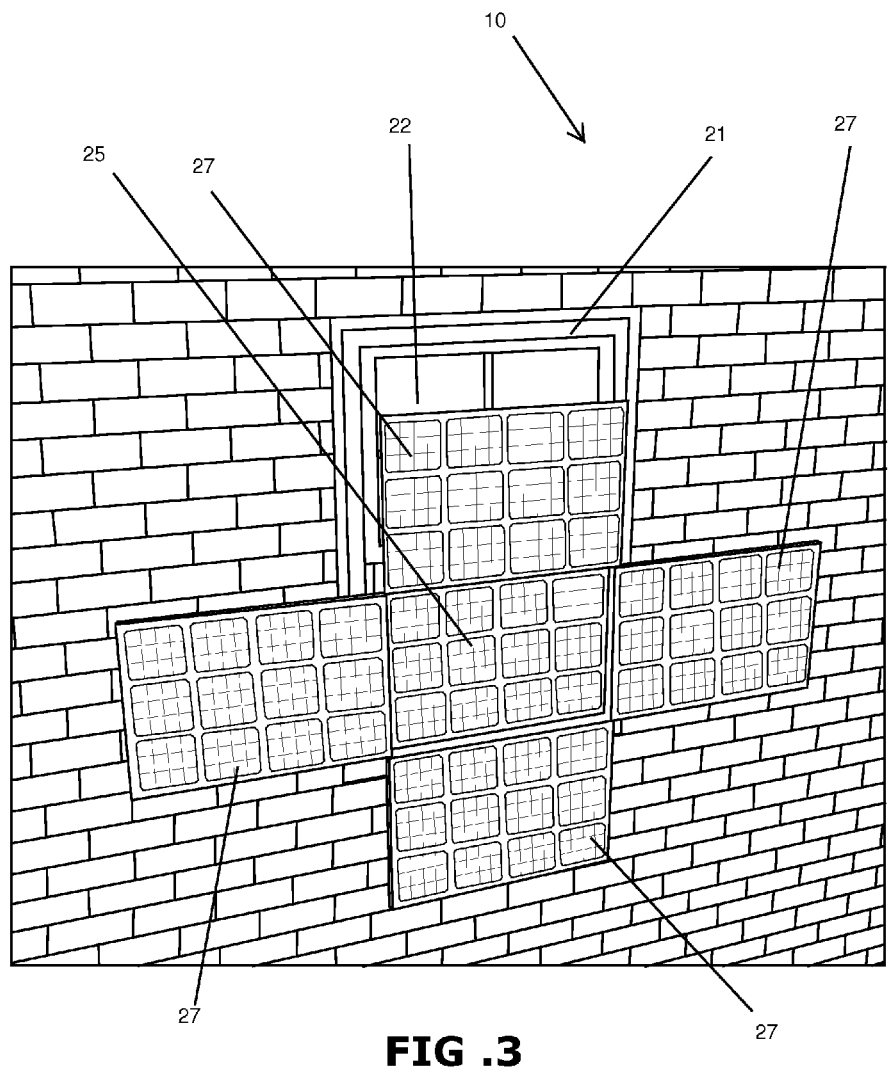
FIG. 3 is a perspective view of a combined window frame and solar-powered electricity generating device positioned at an exterior side of the window frame wherein the solar panel assembly is articulated to a completely unfolded position, in accordance with yet another non-limiting exemplary embodiment.
Figure 4:
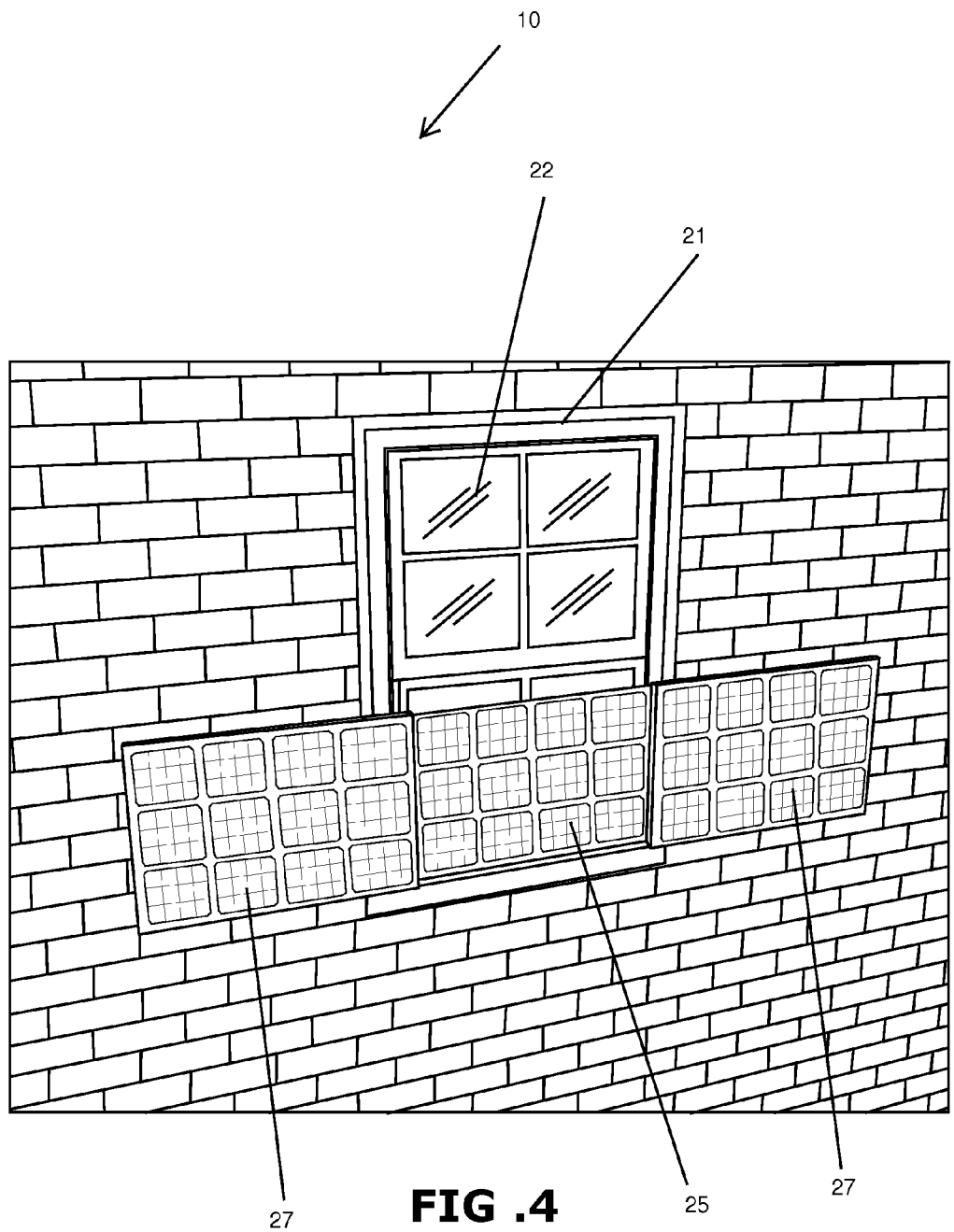
FIG. 4 is a perspective view of a combined window frame and solar-powered electricity generating device positioned at an exterior side of the window frame wherein the solar panel assembly is articulated to a partially unfolded position, in accordance with yet another non-limiting exemplary embodiment.
Figure 5:
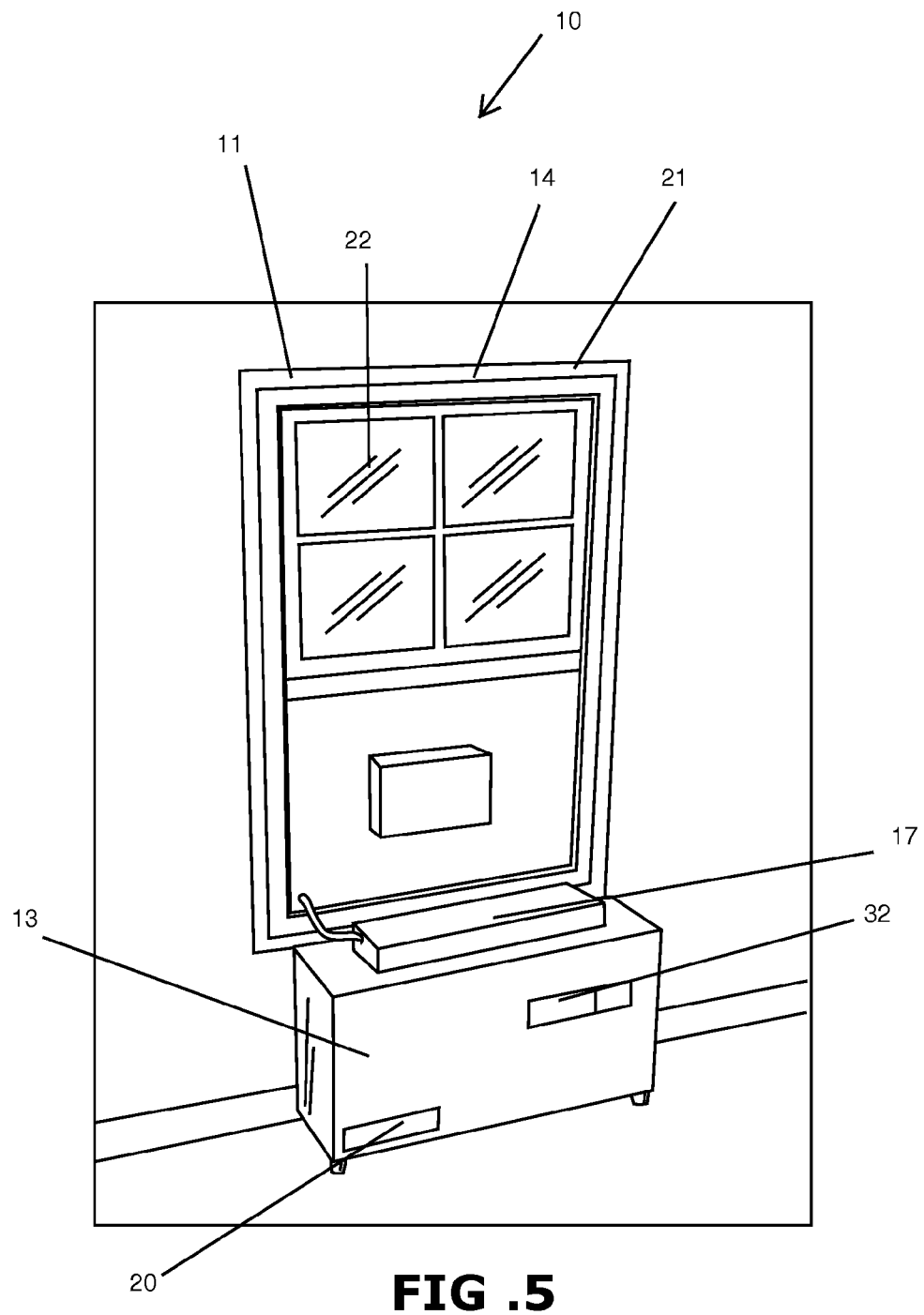
FIG. 5 is a perspective view of a combined window frame and solar-powered electricity generating device powering a window A/C unit.
Figure 6:
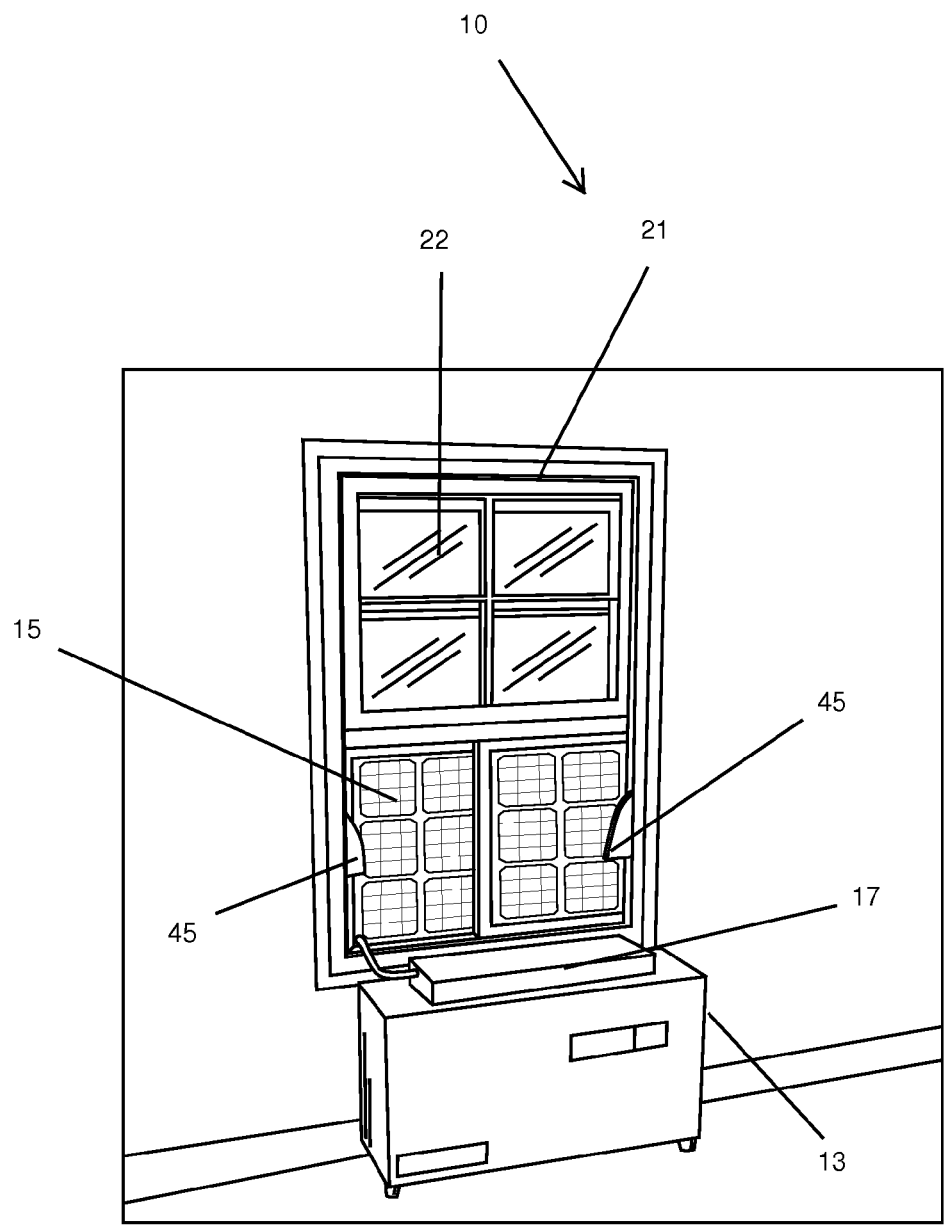
FIG. 6 is a perspective view of a combined window frame and solar-powered electricity generating device employing flaps for maintaining the solar panel assembly at a substantially stable position against an interior side of the window frame, in accordance with yet another non-limiting exemplary embodiment.
Figure 7:
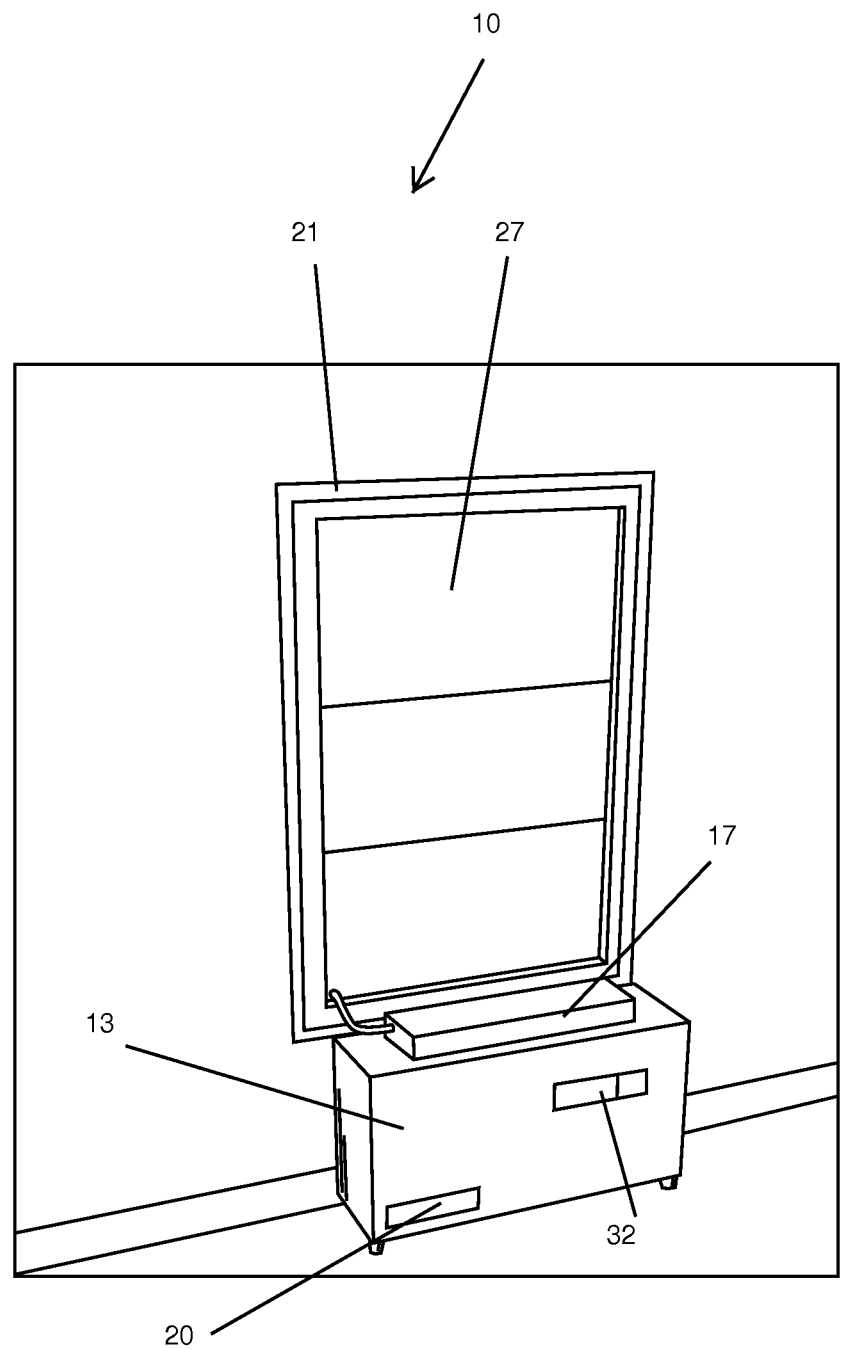
FIG. 7 is a perspective view of a combined window frame and solar-powered electricity generating device wherein selected ones of the peripheral swing-out solar panels are pivoted to a closed position against a backside of the central stationary solar panel, in accordance with yet another non-limiting exemplary embodiment.
Figure 8:
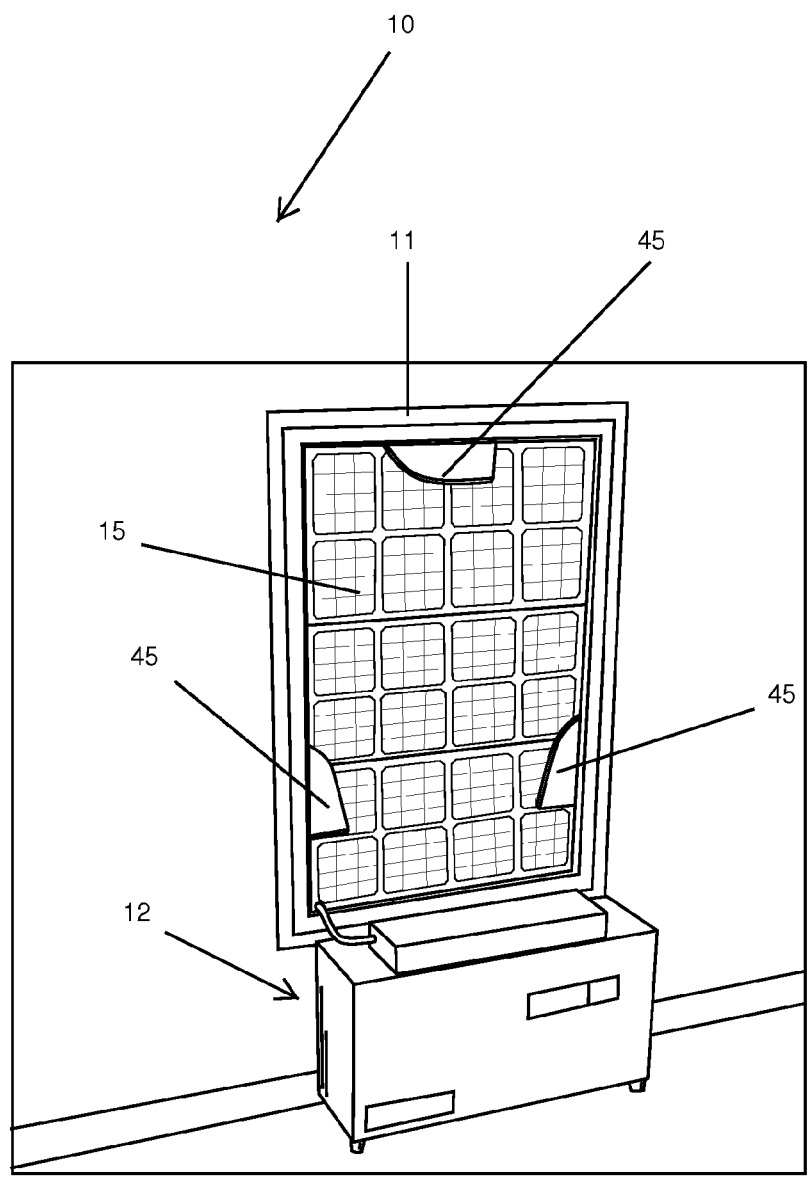
FIG. 8 is a perspective view of a combined window frame and solar-powered electricity generating device wherein selected ones of the peripheral swing-out solar panels are removed from the backside of the central solar panel, in accordance with yet another non-limiting exemplary embodiment.
Figure 9:
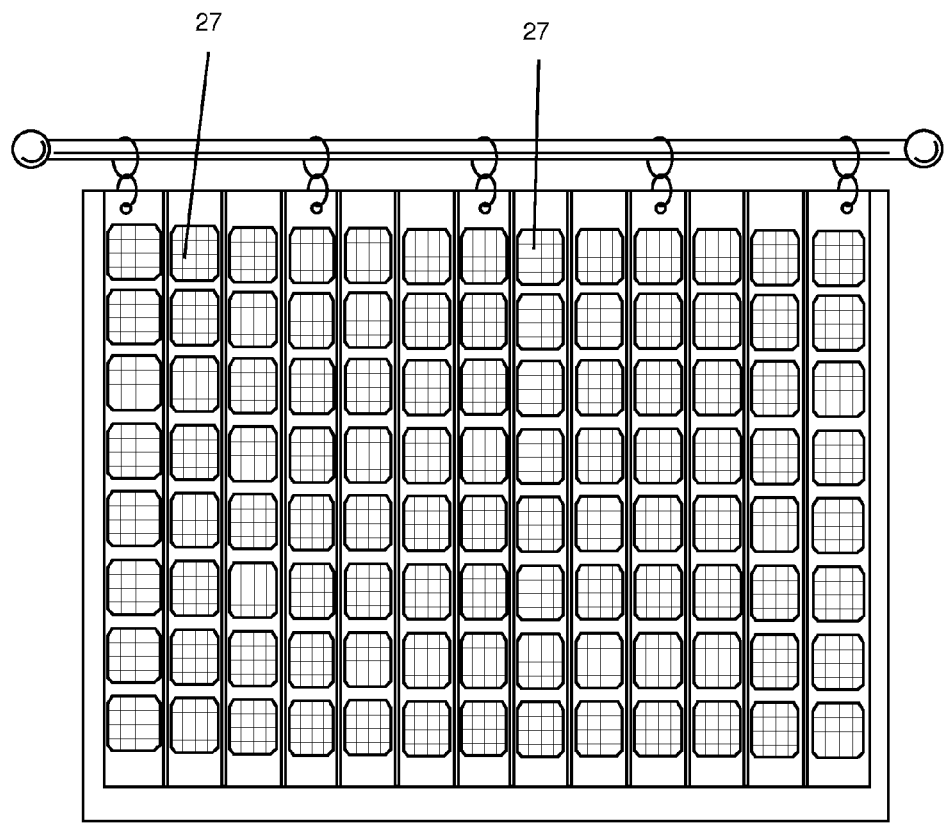
FIG. 9 is a perspective view of a combined window frame and solar-powered electricity generating device retrofitted onto window curtains, in accordance with yet another non-limiting exemplary embodiment.
Figure 10:
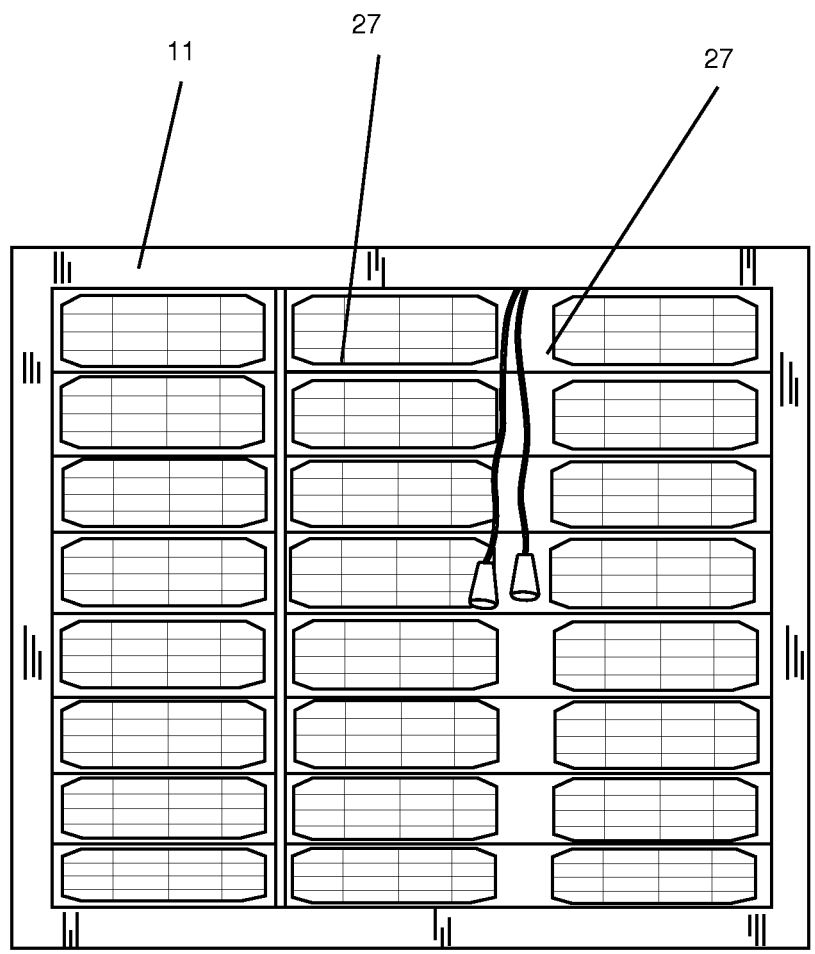
FIG. 10 is a perspective view of a combined window frame and solar-powered electricity generating device retrofitted onto window blinds, in accordance with yet another non-limiting exemplary embodiment.
Figure 11:
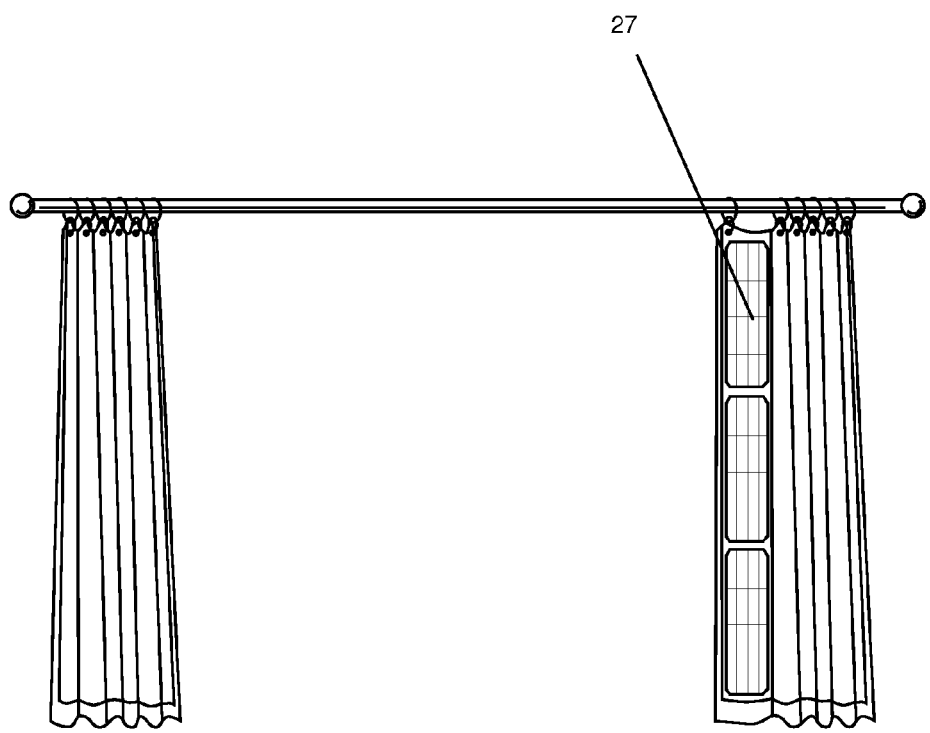
FIG. 11 is a perspective view of a combined window frame and solar-powered electricity generating device retrofitted onto a portion of window curtains, in accordance with yet another non-limiting exemplary embodiment.
Figure 12:
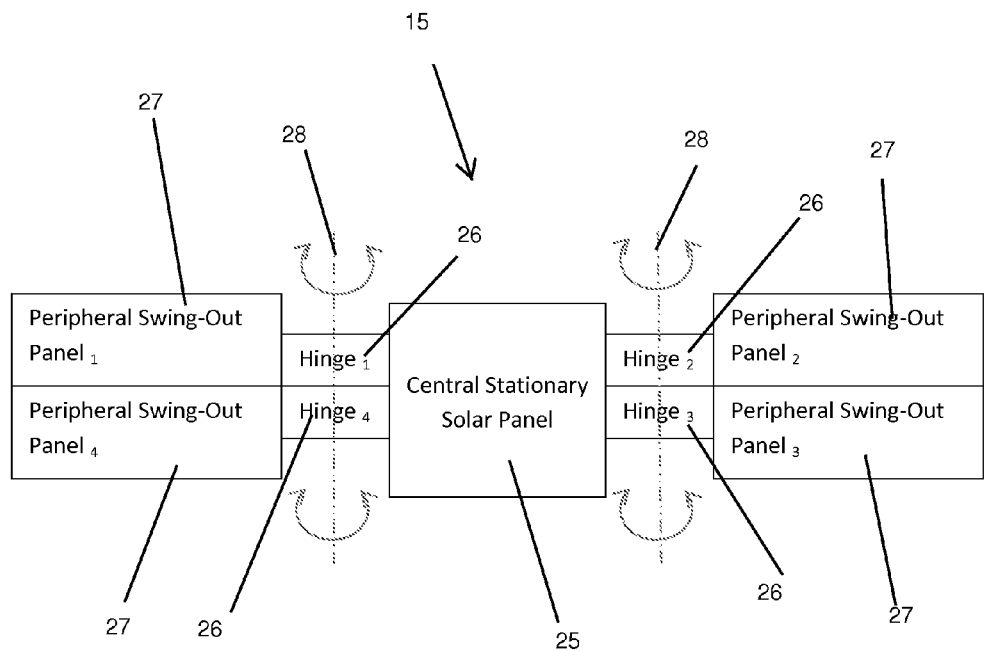
FIG. 12 is a block diagram illustrating pivotal and tilting movements of the peripheral swing-out solar panels relative to fulcrum axes and a fixed plane of the central solar panel, in accordance with yet another non-limiting exemplary embodiment.
Figure 13:
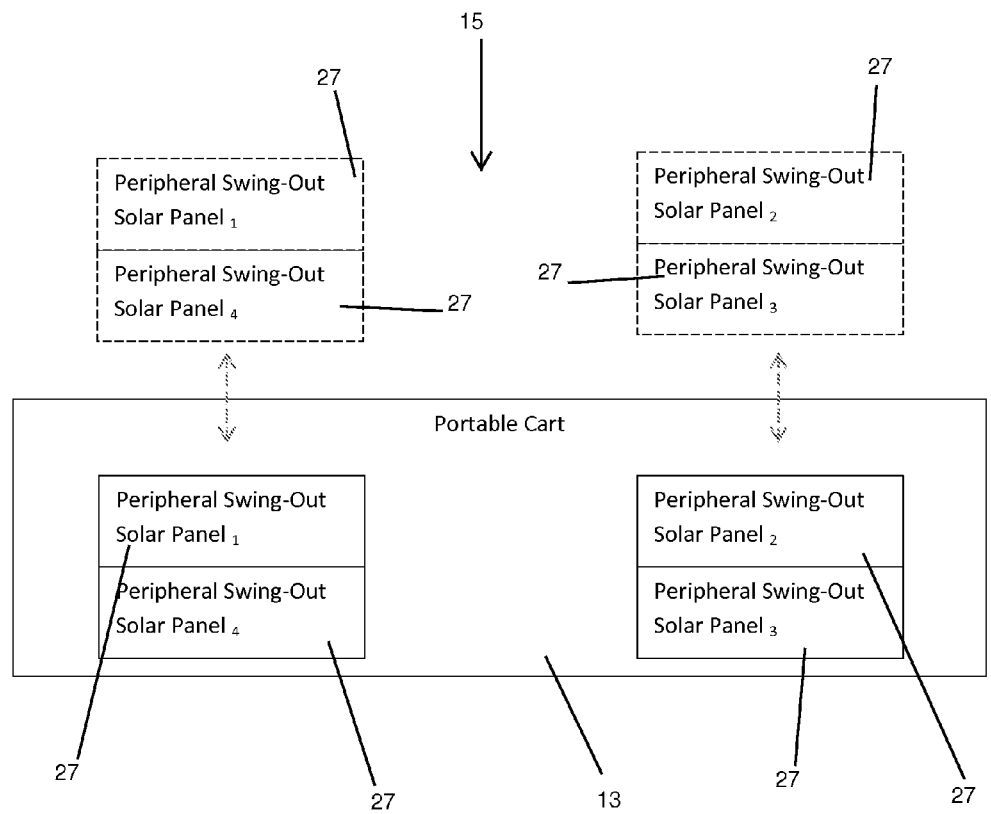
Figure 14:
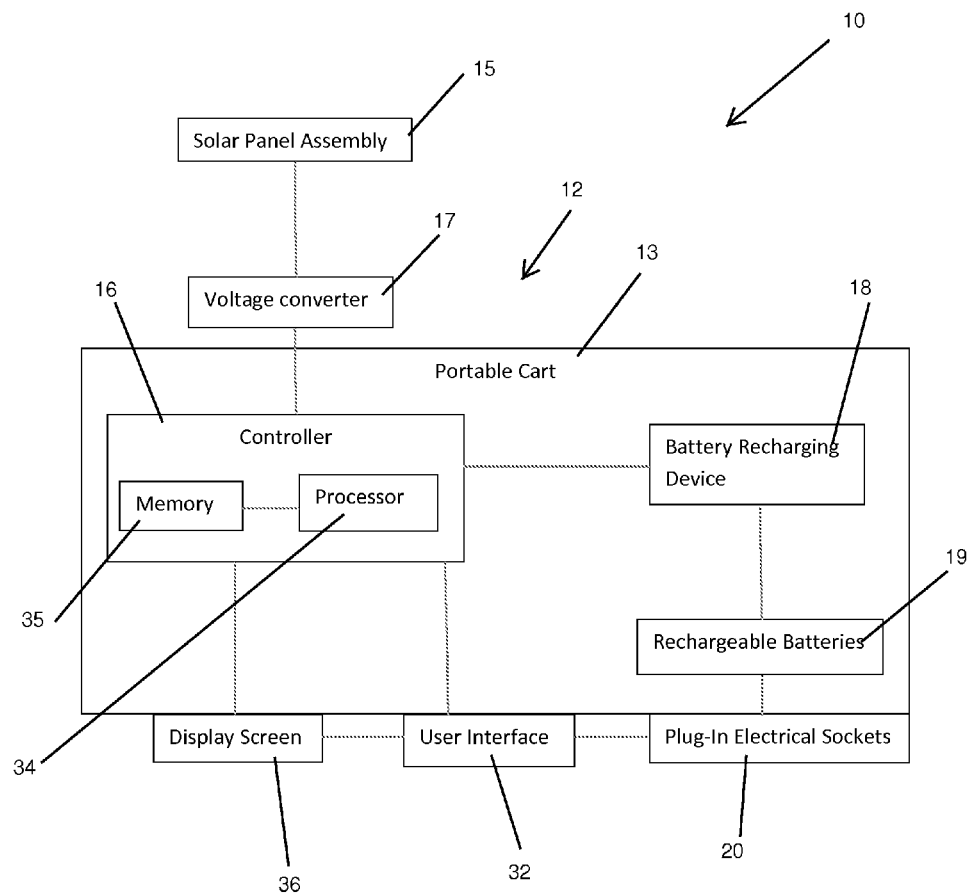

FIG. 13 is a block diagram illustrating storage and retrieval of the solar panel assembly from an interior of the cart; in accordance with yet another non-limiting exemplary embodiment; and FIG. 14 is a high level schematic block diagram illustrating the interrelationship between the major electronic components of the present system, in accordance with yet another non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

The non-limiting exemplary embodiment(s) is/are referred to generally in FIGS. 1-14 and is/are intended to a non-limiting exemplary embodiment of the present disclosure is referred to generally in the figures and is intended to provide a combined window frame 11 and portable, solar-powered back-up electricity generating device 12 (referred to collectively at 10). It should be understood that the exemplary embodiment may be used to power many different types of in home appliances or electrical grids, and should not be limited to any particular in home appliance or electrical grid described herein.

The combined window frame and solar-powered electricity generating device 10 includes a window frame 11, and a solar-powered electricity generating device 12 removably coupled to the window frame 11 in such a manner that the solar-powered electricity generating device 12 is accessible from an interior side 14 of the window frame 11. Advantageously, upon receiving a user input, the solar-powered electricity generating device 12 cooperates with the window frame 11 thereby generating and transmitting power to an existing in-house appliance.

In a non-limiting exemplary embodiment, the solar-powered electricity generating device 12 includes a cart 13 disposed adjacent to the interior side 14 of the window frame 11, a solar panel assembly 15 located exterior of the cart 13 and removably coupled to the window frame 11, a controller 16 located within the cart 13, a voltage converter 17 located exterior of the cart 13 and communicatively coupled to the solar panel assembly 15 as well as the controller 16, a battery recharging device 18 located within the cart 13 and communicatively coupled to the controller 16, a rechargeable battery 19 located within the cart 13 and communicatively coupled to the battery recharging device 18, and a plurality of plug-in electrical sockets 20 communicatively coupled to the rechargeable battery 19. Advantageously, the voltage converter 17 receives and modifies an initial power input signal from the solar panel assembly 15 and thereafter generates and transmits a transformed power output signal to the battery recharging device 18 for recharging the rechargeable battery 19.

In a non-limiting exemplary embodiment, the window frame 11 includes a perimeter support surface 21, and a transparent glass panel 22 attached to the perimeter support surface 21. In this manner, the solar panel assembly 15 is removably affixed directly to each of the perimeter support surface 21 as well as the transparent glass panel 22.

In a non-limiting exemplary embodiment, the solar panel assembly 15 includes a central stationary solar panel 25 having a plurality of hinges 26 attached to opposed corners thereof, respectively. A plurality of peripheral swing-out solar panels 27 are pivotally and adjustably coupled to the hinges 26, respectively. Advantageously, the peripheral swing-out solar panels 27 are configured to articulate about respective fulcrum axes 28 adjacent to the central stationary solar panel 25 as well as tilt along a plane relative to a stationary plane of the central stationary solar panel 25.

In a non-limiting exemplary embodiment, the peripheral swing-out solar panels 27 are detachable from the central stationary solar panel 25 and removably stored within the cart 13.

In a non-limiting exemplary embodiment, the solar panel assembly 15 is directly coupled to the interior side 14 of the window frame 11 and fitted within the perimeter support surface 21 thereof.

In a non-limiting exemplary embodiment, the solar panel assembly 15 is directly coupled to an exterior face 29 of the window frame 11.

In a non-limiting exemplary embodiment, adjustable flaps 45 are coupled to the interior side 14 of the window frame 11 and assist in maintaining the solar panel assembly 15 at a substantially stable position.

In a non-limiting exemplary embodiment, wherein one of the central stationary solar panel 25 and the peripheral swing-out solar panels 27 is fitted within the perimeter support surface 21 of the window frame 11. In addition, another one of the central stationary solar panel 25 and the peripheral swing-out solar panels 27 extends beyond the perimeter support surface 21 of the window frame 11.

A method of utilizing a combined 20 window frame 11 and solar-powered electricity generating device 12 device for supplying power to an existing in-house appliance. Such a method includes the chronological steps of: providing a window frame 11; providing and removably coupling a solar-powered electricity generating device 12 to the window frame 11; accessing the solar-powered electricity generating device 12 from an interior side 14 of the window frame 11; and upon receiving a user input, the solar-powered electricity generating device 12 cooperating with the window frame 11 thereby generating and transmitting power to the existing in-house appliance.

Referring to FIGS. 1-14 in general, in a non-limiting exemplary embodiment, recognizing the potential to offer homeowners and householders a clean, portable, economical way of generating all or part of their electrical power, a combined window frame 11 and solar-powered electricity generating device 12 device has been conceived. Put simply, the electricity generating device 12 may be a product line of portable, wheeled, solar electrical generators, equipped with collapsible, folding solar panels containing arrays of photovoltaic panels, and with storage batteries so that the solar-generated current may be either used immediately to power household appliances, or stored for later, emergency usage.

In a non-limiting exemplary embodiment, the electricity generating device 12, in the closed position, may present itself as a relatively compact, rectangular or square, wheeled cart 13. On a lower corner face of the electricity generating device 12 may be a user interface 32 and several plug-in electrical sockets 20. In the interior of the cart, 13 may be one or more internal power sources (storage batteries). The cart 13 houses a set of swing-out, deployable solar-panels 27 with arrays of photovoltaic cells which effectively convert the energy of sunlight into usable electricity.

In a non-limiting exemplary embodiment, the swing-out panels 27 of the electricity generating device 12 may be configured not only to swing out from each of the four corners of the central solar panel 25, but also to tilt, and to be detachable for use in window frame 11, their electrical cords running back to the cart 13. Connectors will be provided for wiring the voltage converter 17 into the cart 13 electrical panel.

In a non-limiting exemplary embodiment, user interface 32 enables the user to power the device 12 and operate electrical appliances and devices via the power sockets 20. The device 12 may also be set to recharge its storage batteries for emergency back-up, and perhaps to a power grid, in order to feed generated current back into the electric utility's grid—selling excess current or using it to offset one's utility bills. Additional solar-panels 25, 27 may be sold as accessories to expand the device 12 capacity.

In a non-limiting exemplary embodiment, the device 12 may be produced with or without the user interface 32 to provide a variety for consumers to choose from and to use in households including apartment buildings. Fixed solar panels 25 and adjustable solar panels 27 may be provided to make it easy to put or remove such solar panels 25, 27 from window frame 11. The battery system can also be charged using electricity. When ready to use, the device 12 can power electrical devices ranging from cellphones to air-conditioners based on how strong of a voltage level is required.

In a non-limiting exemplary embodiment, the controller 16 preferably includes a processor 34 communicatively coupled to memory 35. Such a memory 35 may include executable computer software instructions that notify a user when internal power supply (storage battery) is fully charged. Such notification may be achieved by sending on/off signals to transducer for example. Processor 34 may be communicatively coupled to the solar panels containing arrays of photovoltaic cells, which receives a stepped down voltage signal from transformer. Processor 34 may also be communicatively coupled to an internal power supply (storage battery), which receives a stepped down voltage signal from transformer. A plurality of plug-in electrical sockets 20 may be removably coupled to connection cord and may be further communicatively coupled to rechargeable battery 19. User interface 32 may be communicatively coupled to processor 34, for adapting electricity generating device 12 between alternate operating modes. A display screen 36 and transducer, may be communicatively coupled to processor 34 to provide real-time visual/audible feedback to the user during electricity generating procedures.

The processor 34 may include a microprocessor or other devices capable of being programmed or configured to perform computations and instruction processing in accordance with the invention. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor.

Functions and process steps described herein may be performed using programmed computer devices and related hardware, peripherals, equipment and networks. When programmed, the computing devices are configured to perform functions and carry out steps in accordance with principles of the invention. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

The memory 35 includes programmable software instructions that are executed by the processor. In particular, the programmable software instructions include a plurality of chronological operating steps that define a control logic algorithm for performing the intended functions of the present invention. Such software instructions may be written in a variety of computer program languages such as C++, Fortran and Pascal, for example. One skilled in the art understands that such software instructions may contain various Boolean logic processes that perform the intended function of the present invention. Therefore, the specific source or object code of the software program is not intended to be a limiting factor in executing the present invention's intended function.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement methods described herein.

It should also be noted that software that implements the disclosed methods may optionally be stored on a tangible storage medium, such as a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

The user interface 32 may include a variety of stand-alone or shared devices that are capable of generating and transmitting a control signal upon receiving a user input. For example, exemplary user interface devices may include a remote controller employing RF, infra-red, acoustic or cellular technology, as well known in the industry. In alternate embodiments, the user interface may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interfaces may include other components, peripherals and software applications provided they are compatible and capable of cooperating with remaining devices of the present invention. In addition, the user interfaces may include information, documents, data and files needed to provide functionality and enable performance of methodologies in accordance with an exemplary embodiment of the invention.

The display screen 36 is configured for displaying various amounts of textual and/or graphical information. The display may be monochrome or color, of various physical dimensions, of various types. In one embodiment, the display may be suitable for displaying full motion video in color. By way of example and not limitation, the display may be comprised of a liquid crystal display (LCD); a field emission display FED; so called "E-ink" technologies, which employ microspheres having at least two reflectance states; a cathode-ray tube (CRT) display; a gas plasma display; an LED readout configured to display alpha-numeric and graphical information; or any other compatible visual display device. In a preferred implementation, the display is large enough to display, with clarity, one or more lines of information. Optionally, the display screen xx may be configured with a touch-screen interface, to present a user with a graphical user interface.

To attract attention, the LEDs are operably coupled to the present invention's processing and signal generation components and configured to controllably flash. The invention is not limited to any restricted number or arrangement of LEDs. Any number and arrangement of LEDs could be provided, within the limits of the present invention's structure and components. For example, columns of LEDs could be provided, in addition to or in lieu of the rows of LEDs. The LEDs may flash if a triggering event is detected, for example. Additionally, any flashing patterns could be used. The LEDs could flash in harmony, randomly or sequentially, or groups (e.g., rows) could flash sequentially, randomly or alternately, or in any other manner likely to attract attention. One or more processing devices and one or more LED drivers manages flashing of the LEDs according to predetermined or user-specified data and instructions.

The powers source may include one or more rechargeable or non-rechargeable disposable batteries 19, photovoltaic cells, and/or an AC adapter or other power supply means.

For example, the transducer may include an audio speaker, a light-emitting source, or a mechanical or electromechanical device that is capable of generating vibrations.

In a non-limiting exemplary embodiment, the combined window frame and electricity generating device (collectively 10)—a portable, easily used generator of clean, sunlight-derived electrical power—has been conceived as a product line, with various models offering various levels of wattage output, and designed for a variety of applications, from use as an emergency back-up source of electrical power; to use as a supplemental, "green generator" to augment utility-provided power; to compact units designed to recharge the batteries of electronic devices ranging from laptops to cellphones.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A combined window frame and solar-powered electricity generating device for supplying power to an existing in-house appliance, said combined window frame and solar-powered electricity generating device comprising:
  a window frame; and
  a solar-powered electricity generating device coupled to said window frame in such a manner that said solar-powered electricity generating device is accessible from an interior side of said window frame;

wherein, upon receiving a user input, said solar-powered electricity generating device generates and transmits power to an existing in-house appliance;

wherein said solar-powered electricity generating device comprises
- a cart disposed adjacent to said window frame,
- a solar panel assembly located exterior of said cart and removably coupled to said window frame,
- a controller located within said cart,
- a voltage converter located exterior of said cart and communicatively coupled to said solar panel assembly as well as said controller,
- a battery recharging device located within said cart and communicatively coupled to said controller,
- a rechargeable battery located within said cart and communicatively coupled to said battery recharging device, and
- a plurality of plug-in electrical sockets communicatively coupled to said rechargeable battery;

wherein said voltage converter receives and modifies an initial power input signal from said solar panel assembly and thereafter generates and transmits a transformed power output signal to said battery recharging device for recharging said rechargeable battery.

2. The combined window frame and solar-powered electricity generating device of claim 1, wherein said window frame comprises:
- a perimeter support surface; and
- a transparent glass panel attached to said perimeter support surface;
- wherein said solar panel assembly is removably affixed directly to said perimeter support surface as well as said transparent glass panel.

3. The combined window frame and solar-powered electricity generating device of claim 2, wherein said solar panel assembly comprises:
- a central stationary solar panel having a plurality of hinges attached to opposed corners thereof, respectively; and
- a plurality of peripheral swing-out solar panels pivotally and adjustably coupled to said hinges, respectively;
- wherein said peripheral swing-out solar panels are configured to articulate about respective fulcrum axes adjacent to said central stationary solar panel as well as tilt along a plane relative to a stationary plane of said central stationary solar panel.

4. The combined window frame and solar-powered electricity generating device of claim 3, wherein said peripheral swing-out solar panels are detachable from said central stationary solar panel and removably stored within said cart.

5. The combined window frame and solar-powered electricity generating device of claim 4, wherein said solar panel assembly is directly coupled to said interior side of said window frame and fitted within said perimeter support surface thereof.

6. The combined window frame and solar-powered electricity generating device of claim 5, wherein said solar panel assembly is directly coupled to an exterior face of said window frame.

7. The combined window frame and solar-powered electricity generating device of claim 3, wherein one of said central stationary solar panel and said peripheral swing-out solar panels is fitted within said perimeter support surface of said window frame, wherein another one of said central stationary solar panel and said peripheral swing-out solar panels extends beyond said perimeter support surface of said window frame.

* * * * *